United States Patent
Shiraki

(10) Patent No.: US 9,927,516 B2
(45) Date of Patent: Mar. 27, 2018

(54) DISTANCE MEASURING APPARATUS AND DISTANCE MEASURING METHOD

(71) Applicant: PANASONIC INTELLECTUAL PROPERTY MANAGEMENT CO., LTD., Osaka (JP)

(72) Inventor: Hirokazu Shiraki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 352 days.

(21) Appl. No.: 14/925,934

(22) Filed: Oct. 28, 2015

(65) Prior Publication Data
US 2016/0047905 A1 Feb. 18, 2016

Related U.S. Application Data

(63) Continuation of application No. PCT/JP2014/005707, filed on Nov. 13, 2014.

(30) Foreign Application Priority Data

Feb. 28, 2014 (JP) ................... 2014-038973

(51) Int. Cl.
*G01S 7/486* (2006.01)
*G01B 11/14* (2006.01)
(Continued)

(52) U.S. Cl.
CPC ............ *G01S 7/4865* (2013.01); *G01B 11/14* (2013.01); *G01S 17/10* (2013.01); *G01S 17/89* (2013.01)

(58) Field of Classification Search
CPC ....... G01S 7/4865; G01S 17/10; G01B 11/16; G01B 11/22
See application file for complete search history.

(56) References Cited

U.S. PATENT DOCUMENTS 7,212,278 B2 5/2007 Doemens et al.
7,417,718 B2 8/2008 Wada et al.
(Continued)

FOREIGN PATENT DOCUMENTS

DE 4305011 A1 8/1994
JP 2004-294420 A 10/2004
(Continued)

OTHER PUBLICATIONS

International Search Report and Written Opinion issued in corresponding International Patent Application No. PCT/JP2014/005707, dated Feb. 17, 2015; with partial English translation.
(Continued)

*Primary Examiner* — Eric L Bolda
(74) *Attorney, Agent, or Firm* — McDermott Will & Emery LLP

(57) ABSTRACT

A distance measuring apparatus includes: a light-emitting element that emits first to third pulsed beams; sensors that detect reflected light that is each of the pulsed beams reflected off an object, convert the reflected light into electrical signals, and accumulate the electrical signals over a predetermined exposure time; and a computing unit that derives a distance to the object using first to third signal amounts output by the sensors as a result of detecting, over the predetermined exposure time from first to third points in time, and the computing unit derives the distance to the object based on a first derived amount that is an amount derived using the first and second signal amounts and a second derived amount that is an amount derived using the second and third signal amounts.

9 Claims, 7 Drawing Sheets

(51) Int. Cl.
*G01S 17/10* (2006.01)
*G01S 17/89* (2006.01)

(56) References Cited

U.S. PATENT DOCUMENTS

| | | | |
|---|---|---|---|
| 7,436,496 | B2 | 10/2008 | Kawahito |
| 7,755,743 | B2 | 7/2010 | Kumahara et al. |
| 8,305,562 | B2* | 11/2012 | Kang .................... G01B 11/22 356/3.01 |
| 8,797,513 | B2 | 8/2014 | Kamiyama et al. |
| 2001/0046317 | A1* | 11/2001 | Kamon ................. G01B 11/25 382/154 |
| 2004/0233416 | A1 | 11/2004 | Doemens et al. |
| 2006/0192938 | A1 | 8/2006 | Kawahito |
| 2007/0097349 | A1 | 5/2007 | Wada et al. |
| 2009/0045359 | A1 | 2/2009 | Kumahara et al. |
| 2013/0162973 | A1* | 6/2013 | Kamiyama ............. G01C 3/08 356/5.01 |
| 2015/0177369 | A1* | 6/2015 | Kostamovaara ...... G01S 17/107 356/5.08 |
| 2015/0301177 | A1* | 10/2015 | Tsukamoto ........... G01S 17/89 356/5.03 |
| 2017/0031008 | A1* | 2/2017 | Davidovic ............ G01J 1/4204 |

FOREIGN PATENT DOCUMENTS

| | | |
|---|---|---|
| JP | 2004-538491 A | 12/2004 |
| JP | 2007-121116 A | 5/2007 |
| JP | 2008-102000 A | 5/2008 |
| JP | 2011-022088 A | 2/2011 |
| JP | 2012-215480 A | 11/2012 |
| JP | 2012-215481 A | 11/2012 |
| JP | 2013-134173 A | 7/2013 |
| WO | 03/016944 A2 | 2/2003 |
| WO | 2009/105857 A1 | 9/2009 |
| WO | 2014/119241 A1 | 8/2014 |

OTHER PUBLICATIONS

Extended European Search Report issued in Application No. 14883846.9 dated Jan. 26, 2017.
Japanese Office Action issued in Application No. 2015-539316 dated Feb. 28, 2017.

* cited by examiner

DISTANCE MEASURING APPARATUS AND DISTANCE MEASURING METHOD

CROSS REFERENCE TO RELATED APPLICATIONS

This is a continuation application of PCT International Application No. PCT/JP2014/005707 filed on Nov. 13, 2014, designating the United States of America, which is based on and claims priority of Japanese Patent Application No. 2014-038973 filed on Feb. 28, 2014. The entire disclosures of the above-identified applications, including the specifications, drawings and claims are incorporated herein by reference in their entirety.

FIELD

The present disclosure relates to a time-of-flight (TOF) distance measuring apparatus and a TOF distance measuring method by which an image of an object is captured and a distance to the object is measured.

BACKGROUND

Patent Literature (PTL) 1 discloses a TOF distance measuring apparatus. This distance measuring apparatus adopts the system of illuminating an object with light (probe light) having a predetermined pulse width and receiving its reflected light by a light-receiving element, to determine a distance to the object. Specifically, the probe light is repeatedly emitted toward the object, and a period from a point in time when the probe light is emitted to a point in time when the probe light is returned, that is, the flight time of the probe light, is measured to measure a distance to the object. Then, the distance measuring apparatus creates data, what is called a depth map, in which the results of distance measurement at respective pixels of the light-receiving element are two-dimensionally arranged. Use of the depth map makes it possible to recognize, at once, respective distances to a plurality of objects present in a wide range, as gray levels (pixel values) of the image.

CITATION LIST

Patent Literature

[PTL 1] Japanese Unexamined Patent Application Publication (Translation of PCT Application) No. 2004-538491

SUMMARY

Technical Problem

The present disclosure provides a distance measuring apparatus and a distance measuring method by which a depth map can be obtained with a small error in a distance computation result.

Solution to Problem

A distance measuring apparatus in the present disclosure includes: a light source that emits a first pulsed beam, a second pulsed beam, and a third pulsed beam which have an identical pulse waveform, within a predetermined time; a light-receiving element including an array of a plurality of sensors that, in synchronization with the light source, detect reflected light, convert the reflected light into electrical signals, and accumulate the electrical signals over a predetermined exposure time, the reflected light being each of the first pulsed beam, the second pulsed beam, and the third pulsed beam that have been emitted from the light source and reflected off an object; and a computing unit configured to derive a distance to the object using a first signal amount, a second signal amount, and a third signal amount, the first signal amount being output by the plurality of sensors as a result of detecting, over the predetermined exposure time from a first point in time, light including the reflected light that is the first pulsed beam reflected off the object, the second signal amount being output by the plurality of sensors as a result of detecting, over the predetermined exposure time from a second point in time, light including the reflected light that is the second pulsed beam reflected off the object, the third signal amount being output by the plurality of sensors as a result of detecting, over the predetermined exposure time from a third point in time, light including the reflected light that is the third pulsed beam reflected off the object, wherein the computing unit is configured to determine a first derived amount and a second derived amount, and derive the distance for each of the plurality of sensors, based on the first derived amount and the second derived amount for the sensor, the first derived amount being an amount derived using the first signal amount and the second signal amount, the second derived amount being an amount derived using the third signal amount and the second signal amount, a delay time from a start of emission of the first pulsed beam to the first point in time is larger than a delay time from a start of emission of the second pulsed beam to the second point in time, and the delay time from the start of emission of the second pulsed beam to the second point in time is larger than a delay time from a start of emission of the third pulsed beam to the third point in time.

A distance measuring method in the present disclosure includes: emitting, from a light source, a first pulsed beam, a second pulsed beam, and a third pulsed beam which have an identical pulse waveform, within a predetermined time; detecting reflected light, converting the reflected light into electrical signals, and accumulating the electrical signals over a predetermined exposure time, by a plurality of sensors in an array, in synchronization with the light source, the reflected light being each of the first pulsed beam, the second pulsed beam, and the third pulsed beam that have been emitted from the light source and reflected off an object; deriving a distance to the object using a first signal amount, a second signal amount, and a third signal amount, the first signal amount being output by the plurality of sensors as a result of detecting, over the predetermined exposure time from a first point in time, light including the reflected light that is the first pulsed beam reflected off the object, the second signal amount being output by the plurality of sensors as a result of detecting, over the predetermined exposure time from a second point in time, light including the reflected light that is the second pulsed beam reflected off the object, the third signal amount being output by the plurality of sensors as a result of detecting, over the predetermined exposure time from a third point in time, light including the reflected light that is the third pulsed beam reflected off the object; and determining a first derived amount and a second derived amount, and deriving the distance for each of the plurality of sensors, based on the first derived amount and the second derived amount for the sensor, the first derived amount being an amount derived using the first signal amount and the second signal amount, the second derived amount being an amount derived using the third signal amount and the second signal amount, wherein a delay time from a start of emission of the first pulsed beam to the first point in time is larger than a delay time from a start of emission of the second pulsed beam to the second point in time, and the delay time from the start of emission of the second pulsed beam to the second point in time is larger than a delay time from a start of emission of the third pulsed beam to the third point in time.

Advantageous Effects

A distance measuring apparatus and a distance measuring method in the present disclosure are effective in obtaining a depth map with a small error in a distance computation result.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

The inventor of the present application found that conventional distance measuring apparatuses have the following problem.

In the conventional TOF apparatus disclosed in the above-described PTL 1, the order of magnitude of a variation width of the flight time is a few nanoseconds, and the order of magnitude of the number of repetitions of measurement is a few thousands to a few tens of thousands, for example, when the distance resolution is set to about a few tens of centimeters and the range of measurement is set to about a few meters. This means that the conventional apparatus requires a very precise control circuit that controls an integration window at the order of magnitude of a few nanoseconds, and also requires, for pulsed probe light as well, such a high speed response as switching between turning on and off at the order of magnitude of a few tens of nanoseconds.

Therefore, handling probe light as a square wave as disclosed in PTL 1 is difficult; a calculation in which rise and fall of probe light are taken into consideration need to be performed to determine a distance to an object. The following shows the calculation process with reference to FIG. 9.

Figure 9:
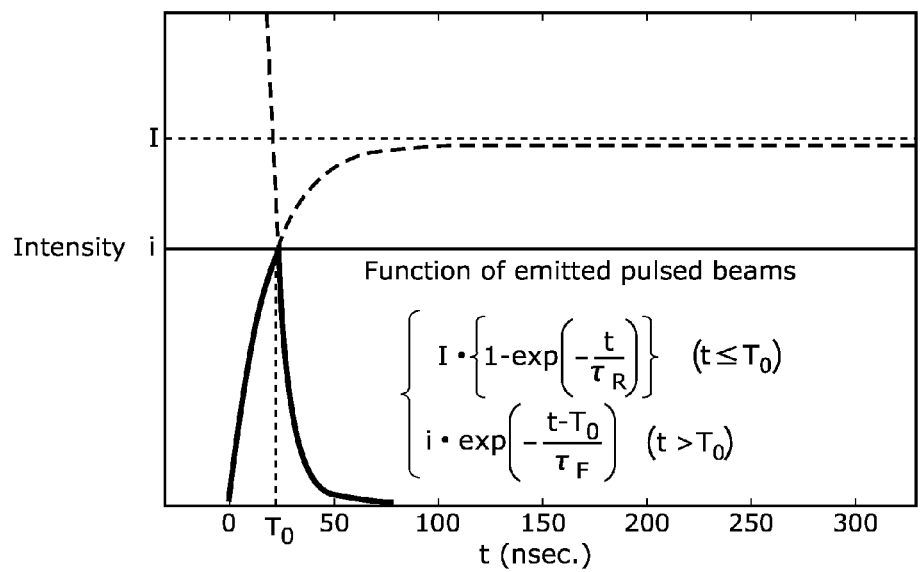
FIG. 9 is a graph showing a time waveform of probe light emitted from a light source of a distance measuring apparatus.

FIG. 9 is a graph showing a time waveform of light-emitting intensity of probe light emitted from a light source of a distance measuring apparatus.

As shown in FIG. 9, light-emitting intensity P of the probe light at a point in time t is represented by the following expressions where the start of emission of the probe light is t=0.

[Math. 1]
$$P = I \cdot \left\{1 - \exp\left(-\frac{t}{\tau_R}\right)\right\} \quad (t \leq T_0) \tag{1}$$

[Math. 2]
$$P = i \cdot \exp\left(-\frac{t - T_0}{\tau_F}\right) \quad (t > T_0) \tag{2}$$

Here, $T_R$ is a time constant for a light emission rise, $T_F$ is a time constant for a light emission fall, $T_0$ is time from the start of a light emission rise to the start of a light emission fall, I is light-emitting intensity at the time when light emission has completely risen, and i is light-emitting intensity at the start of a light emission fall.

A constant exposure time is set to allow a light-receiving element to receive light of this probe light that has been reflected off the object. Here, the light-receiving element includes an array of a plurality of sensors. An exposure period lasts from $t=T_u+t_1$ to $t=T_u+t_2$ where the start of emission of the probe light is t=0. Here, $T_u$ is a point in time of output of an exposure time start trigger signal, $t_1$ is a delay time (a time lag) from when the exposure time start trigger signal is output to when exposure actually starts in the light-receiving element, and $t_2$ is time from when the exposure time start trigger signal is output to when exposure completely ends in the light-receiving element. Assume that a flight time of probe light (a delay time of reflected light) is denoted by $t_f$. A signal amount $G_{j,k}(T_u, t_f)$ of reflected light received by each sensor (j, k) is represented according to a range of the propagation time $t_f$ by the following expressions:

[Math. 3]
$$G_{j,k}(T_u, t_f) = \frac{i}{I} \cdot Q \cdot \int_{t_1+T_u-T_0-t_f}^{t_2+T_u-T_0-t_f} \exp\left(-\frac{t'}{\tau_F}\right) dt' \tag{3}$$

where i) $t_f \leq t_1 + T_u - T_0$

[Math. 4]
$$G_{j,k}(T_u, t_f) = Q \cdot \int_{t_1+T_u-t_f}^{T_0} \left\{1 - \exp\left(-\frac{t'}{\tau_R}\right)\right\} dt' + \tag{4}$$
$$\frac{i}{I} \cdot Q \cdot \int_0^{t_2-T_0+T_u-t_f} \exp\left(-\frac{t'}{\tau_F}\right) dt'$$

where ii) $t_1 + T_u - T_0 < t_f \leq t_1 + T_u$

-continued

[Math. 5]

$$G_{j,k}(T_u, t_f) = Q \cdot \int_0^{T_0} \left\{1 - \exp\left(-\frac{t'}{\tau_R}\right)\right\} dt' + \frac{i}{I} \cdot Q \cdot \int_0^{t_2 - T_0 + T_u - t_f} \exp\left(-\frac{t'}{\tau_F}\right) dt' \quad (5)$$

where iii) $t_1 + T_u < t_f \leq t_2 - T_0 + T_u$

[Math. 6]

$$G_{j,k}(T_u, t_f) = Q \cdot \int_0^{t_2 + T_u - t_f} \left\{1 - \exp\left(-\frac{t'}{\tau_R}\right)\right\} dt' \quad (6)$$

where iv) $t_2 - T_0 + T_u < t_f \leq t_2 + T_u$

Out of the variables in the expressions, $T_R$, $T_F$, $T_0$, $T_u$, $t_1$, $t_2$, I, and i are apparatus-specific values configurable by a designer or manufacturer of the distance measuring apparatus, and Q is a value determined based on attenuation of the probe light and/or reflected light itself dependent on reflectance of the object, a distance to the object, etc., and therefore is not obtainable by a measurer before capturing an image. Accordingly, just one measurement of a signal amount $S=G(T_u, t_f)$ does not enable calculation of the flight time $t_f$.

Therefore, a second signal amount $S'=G'(T_u', t_f)$ is measured in a different exposure period, and a result of division thereof, i.e., $S/S'=G(T_u, t_f)/G'(T_a', t_f)$, is derived as a derived amount to cancel out Q in the above expressions, thereby determining the flight time $t_f$. Once the flight time $t_f$ is determined, a distance L to the object is determined by the following expression where c is a light speed of 299,792,458 m/s.

[Math. 7]

$$L = \frac{c \cdot t_f}{2} \quad (7)$$

Values of the derived amount S/S' are roughly classified into two types depending on values of $T_u$ and $T_u'$. One type is the derived amount S/S' having a value that increases as the distance to the object increases. In this case, $T_u + t_1 > T_u' + t_1$, that is, $T_u > T_u'$, holds for the a delay time from the start of emission of the probe light to the start of exposure. The other type is the derived amount S/S' having a value that increases as the distance to the object decreases. In this case, $T_u + t_1 < T_u' + t_1$, that is, $T_u < T_u'$, holds. Note that the above delay time can be a positive or negative value; a positive delay time means that exposure starts after the start of emission of the probe light, and a negative delay time means that exposure starts before the start of emission of the probe light.

In the case of $T_u > T_u'$, an amount of change in the value of the derived amount S/S' occurring when the position of the object changes decreases as the distance thereto from the light-receiving element decreases. Therefore, in the case where the distance thereto from the light-receiving element is relatively short, even a small variation in the values of the signal amount S and the signal amount S' can more easily lead to an error in a distance computation result calculated therefrom, due to a disturbance component which is superimposed on the signal amount S and the signal amount S' when obtaining them from the light-receiving element. In short, in the case where $T_u > T_u'$, the measurement for a nearby object is unsuitable.

In the case where $T_u < T_u'$, an amount of change in the value of the derived amount S/S' occurring when the position of the object changes decreases as the distance thereto from the light-receiving element increases; an error occurs more easily in the distance computation result, meaning that the measurement for a distant object is unsuitable.

The present disclosure shows what has been achieved based on such findings. Through earnest research, the inventor of the present application conceived the idea of a distance measuring apparatus with which errors in the distance computation result are reduced regardless of the distance from the light-receiving element to the object.

Hereinafter, embodiments are described in detail with reference to the drawings as appropriate. However, there are instances where excessively detailed description is omitted. For example, there are instances where detailed description of well-known matter and redundant description of substantially identical components are omitted. This is to facilitate understanding by a person of ordinary skill in the art by avoiding unnecessary verbosity in the subsequent description.

It is to be noted that the accompanying drawings and subsequent description are provided by the inventor to allow a person of ordinary skill in the art to sufficiently understand the present disclosure, and are thus not intended to limit the scope of the subject matter recited in the Claims.

Embodiment 1

Hereinafter, a distance measuring apparatus 1 according to Embodiment 1 is described with reference to FIG. 1 to FIG. 6.

[1-1. Structure]

First, a structure of the distance measuring apparatus according to this embodiment is described.

Figure 1:
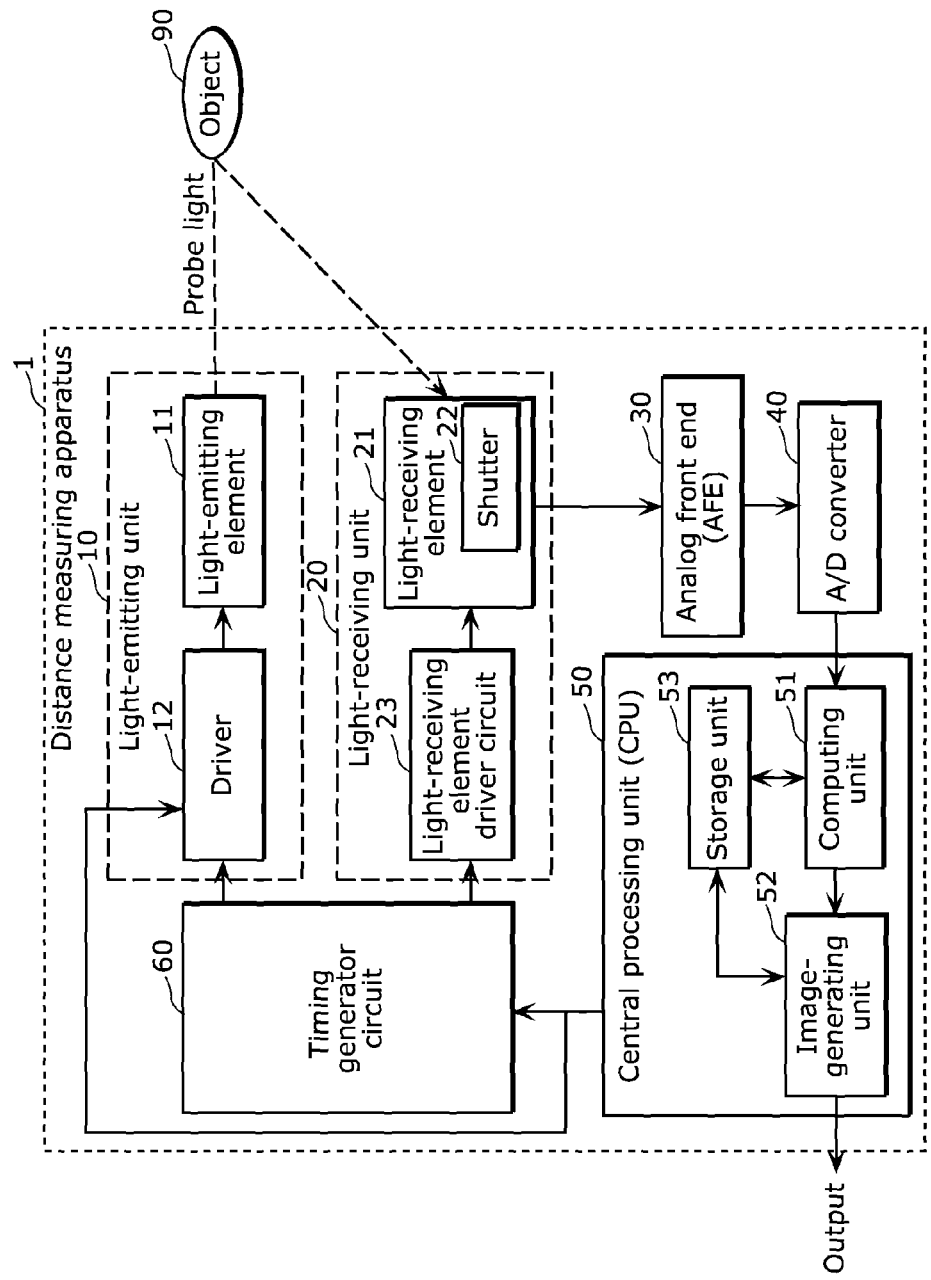
FIG. 1 is a block diagram illustrating main structural elements in a distance measuring apparatus according to Embodiment 1.

FIG. 1 is a block diagram illustrating a main structure of a distance measuring apparatus according to this embodiment.

A distance measuring apparatus 1 illustrated in FIG. 1 is included in a digital still camera or the like, and includes a light-emitting unit 10, a light-receiving unit 20, an analog front end (AFE) 30, an A/D converter 40, a central processing unit (CPU) 50, and a timing generator circuit 60.

The light-emitting unit 10 illustrated in FIG. 1 is a light source that emits (casts) probe light toward a measurement target, namely, an object 90, and includes a light-emitting element 11 and a driver 12

The light-emitting element 11 of the light-emitting unit 10 emits pulsed infrared light. The light-emitting element 11 is not particularly limited and includes, for example, a light emitting diode (LED). Note that the light-emitting element 11 may be dedicated to distance measurement or, when the distance measuring apparatus 1 is mounted in an image capture apparatus or the like, may be designed to be also used as a strobe unit (such as an electric discharge tube or an LED) as well as to emit infrared light to measure a distance.

The driver 12 of the light-emitting unit 10 is a circuit that controls the timing of light emission by the light-emitting element 11 based on a trigger signal from the timing generator circuit 60, and controls light-emitting time and light-emitting intensity of the light-emitting element 11 based on a signal from the CPU 50.

The light-receiving unit 20 illustrated in FIG. 1 is a detecting unit that receives light including the probe light reflected off the measurement target, or the object 90, and includes a light-receiving element 21 and a light-receiving element driver circuit 23. The light-receiving element 21 of the light-receiving unit 20 includes sensors that detect light, convert the light into electrical signals, and accumulate the electrical signals over a predetermined exposure time. The sensors of the light-receiving element 21 are arranged in an array and form pixels of the light-receiving element 21. The sensors of the light-receiving element 21 are not particularly limited and, for example, include a solid-state imaging element such as a charge-coupled device (CCD) and a complementary metal-oxide semiconductor (CMOS). Furthermore, the light-receiving element 21 includes a shutter 22 for controlling a timing of exposure and an exposure time. The light-receiving element 21 receives light through a lens (not illustrated in the drawings) when the shutter 22 is open. The shutter 22 may be in the form of an external shutter such as a mechanical shutter and an electro-optic shutter, or may be implemented without an external shutter but using an electronic shutter function of the light-receiving element 21. The light-receiving element 21 may be dedicated to distance measurement, or when the distance measuring apparatus is mounted in an image capture apparatus such as a digital still camera, the light-receiving element 21 may also be used as an imaging element for capturing an image. Furthermore, the light-receiving element 21 may include a filter for reducing the impact of surrounding light at the time of distance measurement. The light-receiving element driver circuit 23 of the light-receiving unit 20 provides drive control of the light-receiving element 21 based on a trigger signal from the timing generator circuit 60.

The AFE 30 illustrated in FIG. 1 is a processing unit that processes an analog signal output from the light-receiving element 21. The AFE 30 outputs to the A/D converter 40 a signal obtained through processes such as noise removal and gain control on the analog signal output from the light-receiving element 21.

The A/D converter 40 illustrated in FIG. 1 is a processing unit that converts to a digital signal the analog signal output from the AFE 30.

The CPU 50 illustrated in FIG. 1 is a processing unit that performs integrated control over the operations of the whole distance measuring apparatus 1, and controls the distance measuring apparatus 1 according to a predetermined program. The CPU 50 also controls the timing generator circuit 60 and the driver 12 of the light-emitting unit 10. The CPU 50 includes a computing unit 51, an image-generating unit 52, and a storage unit 53.

The computing unit 51 of the CPU 50 computes a distance between the distance measuring apparatus 1 and the object 90 based on the digital signal output by the A/D converter 40. Computed per-pixel distance data is input to the image-generating unit 52.

The image-generating unit 52 of the CPU 50 is a processing unit that generates a depth map based on the per-pixel distance data output by the computing unit 51.

The storage unit 53 of the CPU 50 is memory including, for example, read-only memory (ROM) on which a program that is processed by the CPU 50, various data required for control, and so on are recorded, and read-access memory (RAM) which has working space for the CPU 50 to perform various computing processes, etc.

The timing generator circuit 60 illustrated in FIG. 1 inputs to the driver 12 a trigger signal for determining the timing of light emission by the light-emitting element 11, and inputs to the light-receiving element driver circuit 23 a trigger signal for determining the timing of exposure by the light-receiving element 21. The timing generator circuit 60 is controlled by the image-generating unit 52 of the CPU 50.

[1-2. Principle of Distance Measurement]

Next, the principle of distance measurement by the distance measuring apparatus 1 according to this embodiment is described.

A basic principle of a method of calculating a distance L to the object 90 by the distance measuring apparatus 1 is the TOF method. The TOF method represents a method of determining the distance L to the object 90 by emitting light to the object 90 and measuring the time taken for the light to be received by the light-receiving element. Specifically, the distance L is determined using Expressions (3) to (7) stated above.

As described above, measuring a distance to the object 90 located nearby is unsuitable in the case where $T_u > T_u'$, and measuring a distance to the object 90 located away is unsuitable in the case where $T_u < T_a'$, when using the method of determining a distance according to Expressions (3) to (7). In light of this, this embodiment employs a method in which the case of $T_u > T_u'$ and the case of $T_u < T_u'$ are combined. The timing of signal accumulation by the light-receiving element 21 for adopting this method is described with reference to FIG. 2.

Figure 2:
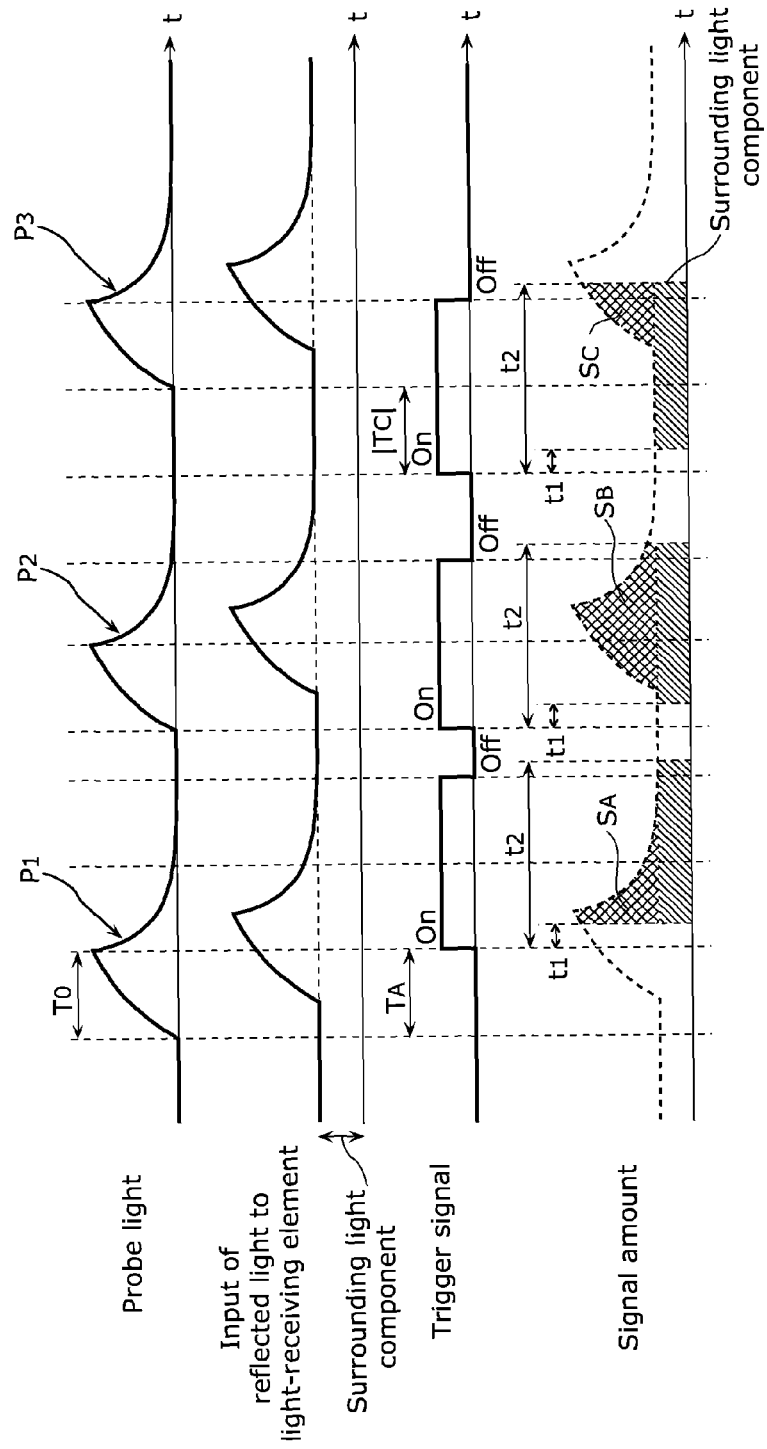
FIG. 2 is a timing chart showing an example of each time waveform of a distance measuring apparatus according to Embodiment 1.

FIG. 2 is a timing chart showing an example of light-emitting intensity of probe light, incident intensity of light reflected off the object 90 into the light-receiving element 21, intensity of a trigger signal for driving the shutter 22 of the light-receiving element 21, and a signal amount of electrical signals accumulated in the sensor of the light-receiving element 21. The areas of shaded regions in the time waveform which are indicated at the lowest stage of FIG. 2 represent signal amounts ($S_A$, $S_B$, and $S_C$). As shown in FIG. 2, the distance measuring apparatus 1 according to this embodiment adopts three different timings as the timing of opening the shutter 22 of the light-receiving element 21 at the start of emission of the probe light. Specifically, assuming that the start of emission of the probe light is t=0 and that the timing of output of the trigger signal from the timing generator circuit 60 to the light-receiving element driver circuit 23 is $t=T_u$, $T_u$ has three values.

In the example shown in FIG. 2, the light-emitting element 11 emits, within a predetermined time, probe light including a first pulsed beam $P_1$, a second pulsed beam $P_2$, and a third pulsed beam $P_3$. The predetermined time may be so short that changes in the environment, such as in the surrounding light, within the predetermined time, are negligible. For example, the predetermined time may be set to one second or less although it depends on the environment in which the distance measurement is performed. The above pulsed beams each have time $T_0$ lasting from the start of a light emission rise to the start of a light emission fall, and light-emitting intensity i at the start of a light emission fall, each of which is common to the respective pulsed beams. This means that the above pulsed beams have an identical pulse waveform. The case of the above pulsed beams having an identical pulse waveform includes the case of the above pulsed beams having substantially identical pulse waveforms, such as the case of the above pulsed beams having pulse waveforms that are as different as a range of error in the output control on the light-emitting element 11.

In this embodiment, timings of outputting trigger signals corresponding to the first pulsed beam $P_1$, the second pulsed beam $P_2$, and the third pulsed beam $P_3$ are $T_u = T_A = T_0$ (>0), $T_u = T_B$ (=0), and $T_u = T_C = -T_0$ (<0), as an example. Accordingly, the signal amounts in the sensor of the light-receiving element 21 that correspond to the first pulsed beam $P_1$, the second pulsed beam $P_2$, and the third pulsed beam $P_3$ are $S_A=G_{j,k}(T_A, t_f)$, $S_B=G_{j,k}(T_B, t_f)$, and $S_C=G_{j,k}(T_C, t_f)$. In FIG. 2, $t_1$ is time required until the shutter 22 is actually opened after the trigger signal is output from the timing generator circuit 60, and $t_2$ is time required until the shutter 22 is actually closed after the trigger signal is output from the timing generator circuit 60.

In this embodiment, $T_u=T_A$ and $T_u'=T_B$ (=0) are selected and $S_A/S_B$ is derived as a derived amount when $T_u>T_a'$, and $T_u=T_c$ (<0) and $T_u'=T_B$ (=0) are selected and $S_c/S_B$ is derived as a derived amount when $T_u<T_u'$.

The above derived amounts are described with reference to FIG. 3 and FIG. 4.

Figure 3:
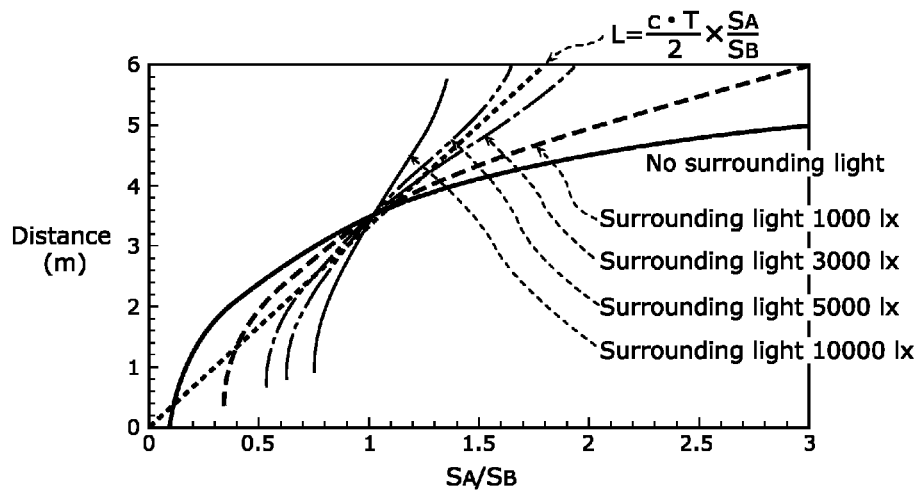
FIG. 3 is a graph showing the relationship between a distance L and a derived amount $S_A/S_B$ in a distance measuring apparatus according to Embodiment 1.

FIG. 3 is a graph showing the relationship between the distance L to the object 90 and the derived amount $S_A/S_B$, using an amount of surrounding light of the distance measuring apparatus 1 as a parameter. For the graph, the following is assumed: $T_R=18$ ns, $T_F=8$ ns, $T_0=22.2$ ns, $t_1=14.2$ ns, $t_2=48.3$ ns, and i=0.715*I. The thick solid line, the broken line, the dash-dot line, the dash-dot-dot line, and the thin solid line in FIG. 3 show respective relationships between the distance L and the derived amount $S_A/S_B$ where the amount of surrounding light is zero, 1,000 lx, 3,000 lx, 5,000 lx, and 10,000 lx. The dotted line in FIG. 3 shows the relationship between the distance L and the derived amount $S_A/S_B$ where it is assumed that the probe light is square-wave pulsed light. As shown in FIG. 3, the derived amount $S_A/S_B$ increases as the distance L to the object 90 increases, in any of the cases with the above amounts of surrounding light. Since the light-emitting intensity of the probe light that is emitted by the light-emitting unit 10 changes over time within a light-emitting period, increase and decrease in the derived amount $S_A/S_B$ have a nonlinear relationship with changes in the distance L as shown in FIG. 3.

Figure 4:
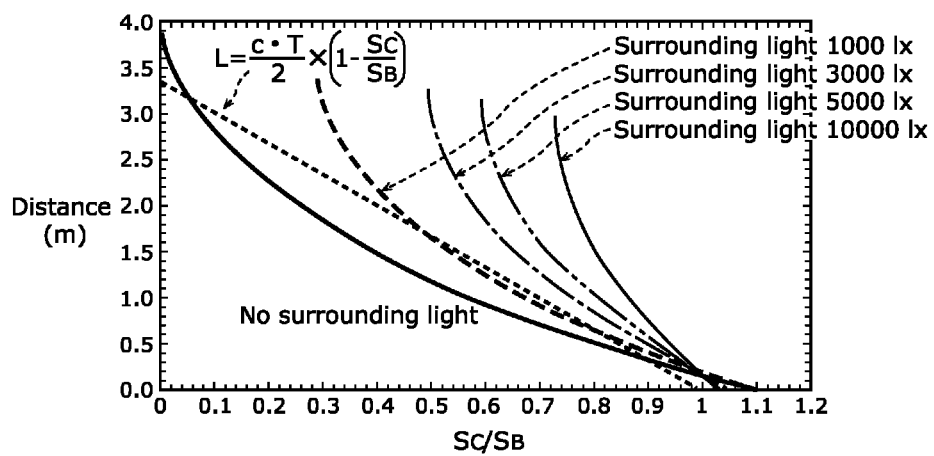
FIG. 4 is a graph showing the relationship between a distance L and a derived amount $S_C/S_B$ in a distance measuring apparatus according to Embodiment 1.

FIG. 4 is a graph showing the relationship between the distance L to the object 90 and the derived amount $S_C/S_B$, using an amount of surrounding light of the distance measuring apparatus 1 as a parameter. The thick solid line, the broken line, the dash-dot line, the dash-dot-dot line, and the thin solid line in FIG. 4 show respective relationships between the distance L and the derived amount $S_C/S_B$ where the amount of surrounding light is zero, 1,000 lx, 3,000 lx, 5,000 lx, and 10,000 lx. The dotted line in FIG. 4 shows the relationship between the distance L and the derived amount $S_C/S_B$ where it is assumed that the probe light is square-wave pulsed light. As shown in FIG. 4, the derived amount $S_C/S_B$ increases as the distance L to the object 90 increases, in any of the cases with the above amounts of surrounding light. Since the light-emitting intensity of the probe light that is emitted by the light-emitting unit 10 changes over time within a light-emitting period, increase and decrease in the derived amount $S_C/S_B$ have a nonlinear relationship with changes in the distance L as shown in FIG. 4.

As shown in FIG. 3, in the case of using the derived amount $S_A/S_B$, an amount of change in the value of the derived amount $S_A/S_B$ occurring upon a change in the distance to the object 90 (the position of the object 90) relatively decreases as the distance thereto from the light-receiving element 21 decreases. Accordingly, when the values of the signal amount $S_A$ and the signal amount $S_B$ vary due to a disturbance component which is superimposed on the signal amount $S_A$ and the signal amount $S_B$ when obtaining them from the light-receiving element 21, a greater error occurs in the distance computation result as the object 90 is located closer to the light-receiving element 21. Thus, measuring the distance L to the object 90 located away is suitable in the case of using the derived amount $S_A/S_B$.

In contrast, as shown in FIG. 4, in the case of using the derived amount $S_C/S_B$, an amount of change in the value of the derived amount $S_C/S_B$ occurring upon a change in the position of the object relatively decreases as the distance thereto from the light-receiving element 21 increases. Thus, measuring the distance L to the object 90 located nearby is suitable in the case of using the derived amount $S_C/S_B$.

Therefore, in this embodiment, $T_A$, $T_B$, and $T_C$ are set to values which satisfy the relationship $T_A>T_B>T_C$ when the respective exposure periods for the probe light are set to $T_A+t_1$ to $T_A+t_2$, $T_B+t_1$ to $T_B+t_2$, and $T_C+t_1$ to $T_C+t_2$. The signal amounts $S_A$, $S_B$, and $S_C$ are then detected, and the derived amount $S_A/S_B$ and the derived amount $S_C/S_B$ are calculated. Here, distance data derived from the derived amount $S_A/S_B$ is adopted for the distance L to the object 90 located away and distance data derived from the derived amount $S_C/S_B$ is adopted for the distance L to the object 90 located nearby, allowing a depth map having high accuracy to be obtained over the entire distance range. The boundary value of a distance for which the derived amount $S_A/S_B$ or the derived amount $S_C/S_B$ is used is not particularly limited; for example, the boundary value may be a distance that satisfies $S_A/S_B=S_C/S_B$. Setting the boundary value in this way makes it possible to select, as the derived amount for use in distance computation, one of the derived amounts that leads to a smaller computation error.

The values of $T_A$, $T_B$, and $T_C$ and the predetermined exposure time $(t_2-t_1)$ are determined according to a measurement distance range required by the distance measuring apparatus 1. Specifically, the values of $T_A$, $T_B$, and $T_C$ and the predetermined exposure time $(t_2-t_1)$ are determined so that at least part of the reflected light of each of the first pulsed beam, the second pulsed beam, and the third pulsed beam, which is light reflected off the object 90 located within the measurement distance range, is detected by the light-receiving element 21.

Although the principle of distance measurement according to this embodiment has been described above, surrounding light may be in practice superimposed onto the reflected light that is detected by the sensors of the light-receiving element 21, causing an error in the distance computation. Therefore, the following describes processing for reducing the impact of surrounding light in the distance computation in order to further improve the accuracy of the distance computation.

In this processing for reducing the impact of surrounding light, the derived amount $S_A/S_B$ and the derived amount $S_C/S_B$ are calculated first, using the signal amounts $S_A$, $S_B$, and $S_C$ detected by each of the sensors. Next, the derived amounts are compared to each other, and when a difference between the derived amounts is within a predetermined range, the amount of surrounding light is estimated based on values of these derived amount $S_A/S_B$ and derived amount $S_C/S_B$. A method of this estimation is described with reference to FIG. 5.

Figure 5:
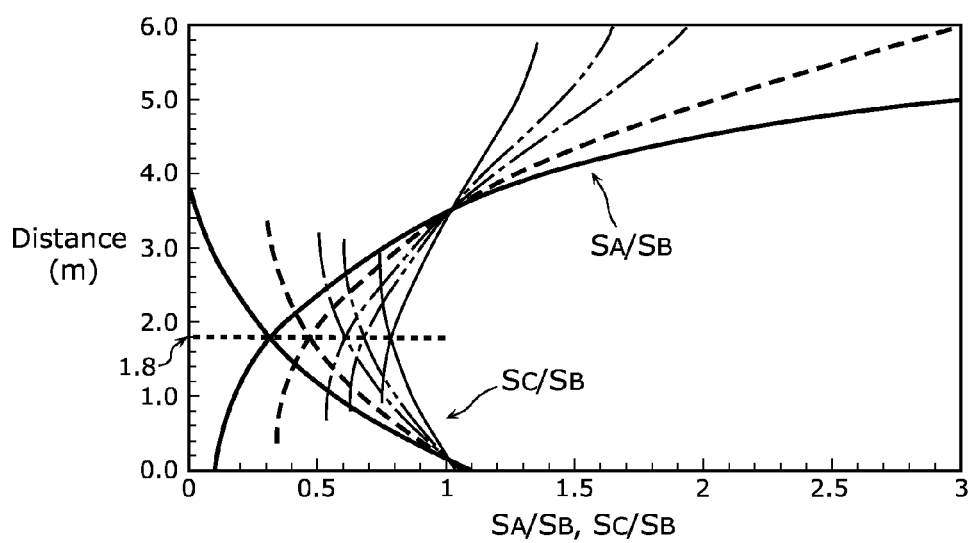
FIG. 5 is a graph showing the relationship between a distance L and derived amounts $S_A/S_B$ and $S_C/S_B$ in a distance measuring apparatus according to Embodiment 1.

FIG. 5 is a graph which combines the graph showing the relationship between the distance L and the derived amount $S_A/S_B$ (FIG. 3) and the graph showing the relationship between the distance L and the derived amount $S_C/S_B$ (FIG. 4), using the amount of surrounding light of the distance measuring apparatus 1 as a parameter. For a particular amount of surrounding light, the graphs for the respective derived amounts intersect at one point. The value of the derived amount at that intersection changes according to the value of the amount of surrounding light whereas the distance L at that intersection does not change regardless of the amount of surrounding light. Thus, with the signal amounts $S_A$, $S_B$, and $S_C$ of light reflected off the object 90 located at the distance L that is at that intersection of the derived amount $S_A/S_B$ and the derived amount $S_C/S_B$, the derived amount $S_A/S_B$ and the derived amount $S_C/S_B$ are the same value in all the cases with the above amounts of surrounding light. For example, in the example shown in FIG. 5, these derived amounts are the same value when the distance L is 1.8 m.

Therefore, if a difference between the derived amount $S_A/S_B$ and the derived amount $S_C/S_B$ is within a predetermined range, the distance L to the object 90 can be derived instantly without the need to perform distance computation processing. Note that the criterion for the determination is whether the difference between the derived amount $S_A/S_B$ and the derived amount $S_C/S_B$ "is within a predetermined range" rather than "is zero." This is because having a certain range of tolerance in determining the above derived amounts to be the same value is realistic under the present circumstances that it is rare that the derived amount $S_A/S_B$ and the derived amount $S_C/S_B$ completely match each other as a disturbance component is superimposed on each of the signal amounts.

In order to estimate surrounding light, a table of comparison (a lookup table) on various amounts of surrounding light and the derived amount $S_A/S_B$ or the derived amount $S_C/S_B$ that is at an intersection in the graph of FIG. 5 is obtained in advance by calculation and recorded onto the storage unit 53 of the CPU 50, for example. When a difference between the derived amount $S_A/S_B$ and the derived amount $S_C/S_B$ is within a predetermined range, the amount of surrounding light can be estimated with reference to the comparison table. Thus, the distance measuring apparatus 1 is capable of estimating the amount of surrounding light without another process of measuring the amount of surrounding light.

[1-3. Operation]

Figure 6:
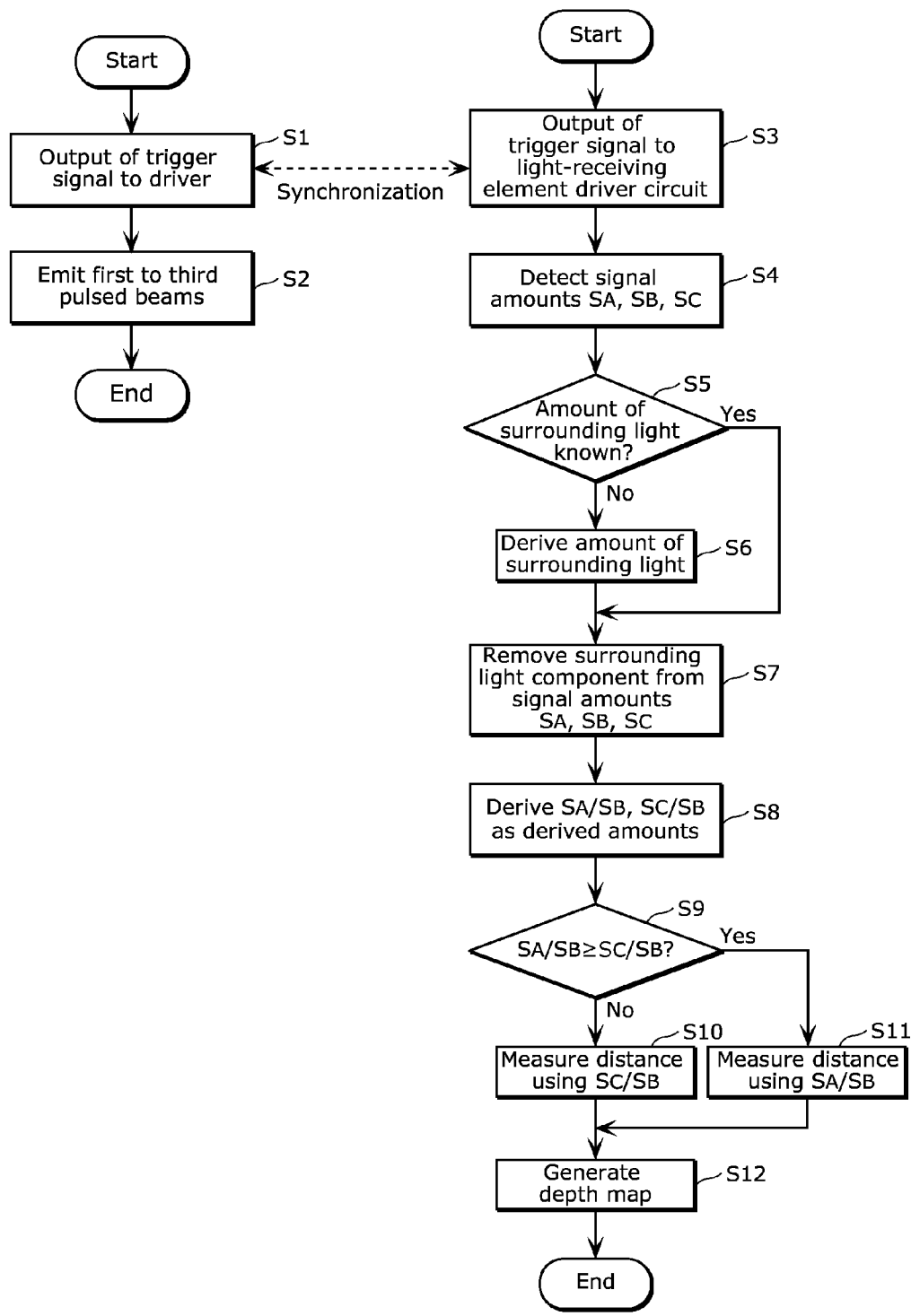
FIG. 6 is a flowchart showing a flow of operation performed by a distance measuring apparatus according to Embodiment 1.

The following describes, with reference to FIG. 6, a flow in which the distance measuring apparatus 1 according to this embodiment is operated based on the above-described principle to measure a distance to the object 90.

FIG. 6 is a flowchart showing a flow of operations performed by the distance measuring apparatus 1 according to this embodiment.

First, a flow of operations which the light-emitting unit 10 performs is described. The timing generator circuit 60 outputs to the driver 12 a trigger signal such as that illustrated in FIG. 2, in response to a command from the image-generating unit 52 of the CPU 50 (51). The driver 12 receives the trigger signal and inputs to the light-emitting element 11 a signal for causing the light-emitting element 11 to emit pulsed beams. The light-emitting element 11 receives the signal from the driver 12 and intermittently sequentially emits the probe light, such as that illustrated in FIG. 2, including the first pulsed beam $P_1$, the second pulsed beam $P_2$, and the third pulsed beam $P_3$ (S2).

Next, a flow of operations which the light-receiving unit 20 etc., performs is described. After receiving the command from the image-generating unit 52 of the CPU, the timing generator circuit 60 outputs a trigger signal to the light-receiving element driver circuit 23 in synchronization with the timing of outputting the trigger signal to the driver 12 (S3). Here, "in synchronization with the timing of outputting the trigger signal" includes not only the case of "at the same time as the timing of outputting the trigger signal," but also the case of "upon the lapse of a predetermined time after the timing of outputting the trigger signal."

The light-receiving element driver circuit 23 receives the trigger signal and, while the trigger signal is ON, causes the shutter 22 of the light-receiving element 21 to be open for a predetermined exposure time so that each sensor of the light-receiving element 21 can detect light. Each sensor of the light-receiving element 21 detects light including each of the above pulsed beams reflected off the object 90, converts the light into electrical signals, and accumulates the electrical signals while the shutter 22 is open. Each sensor of the light-receiving element 21 detects the signal amounts $S_A$, $S_B$, and $S_C$ that are in one-to-one correspondence with the first pulsed beam $P_1$, the second pulsed beam $P_2$, and the third pulsed beam $P_3$ (S4).

The signal amounts $S_A$, $S_B$, and $S_C$, which are analog signals accumulated in each sensor of the light-receiving element 21, are input to the AFE 30. The AFE 30 performs noise removal and the like process on the signal amounts $S_A$, $S_B$, and $S_C$, which are analog signals, and the A/D converter 40 converts resultant signals into digital signals. The signal amounts $S_A$, $S_B$, and $S_C$, which are digital signals resulting from the conversion by the A/D converter 40 on the signal amounts corresponding to the first pulsed beam $P_1$, the second pulsed beam $P_2$, and the third pulsed beam $P_3$, are input to the computing unit 51 of the CPU 50.

When the amount of surrounding light of the distance measuring apparatus 1 is not known (No in S5), the computing unit 51 determines a difference between the derived amount $S_A/S_B$ and the derived amount $S_C/S_B$ of a pixel corresponding to each sensor of the light-receiving element 21, and searches for a pixel having the difference that is within a predetermined range. When the difference between the derived amount $S_A/S_B$ and the derived amount $S_C/S_B$ is determined and the pixel having the difference that is within the predetermined range is found, the computing unit 51 compares the value of the derived amount $S_A/S_B$ or the derived amount $S_C/S_B$ that corresponds to that pixel with a derived amount in the comparison table recorded on the storage unit 53 and showing the relationship between the derived amount and the amount of surrounding light, and determines an amount of surrounding light that is associated with that derived amount (S6). When the amount of surrounding light is known before the above-described step of determining an amount of surrounding light (Yes in S5), the computing unit 51 does not perform the above-described computation for determining an amount of surrounding light, and performs the following computation.

Next, the computing unit 51 removes surrounding light components from the signal amounts $S_A$, $S_B$, and $S_C$ input from the A/D converter 40, thereby obtaining new signal amounts $S_A$, $S_B$, and $S_C$ (S7). The computing unit 51 derives $S_A/S_B$ and $S_C/S_B$, as derived amounts, using these new signal amounts $S_A$, $S_B$, and $S_C$ (S8). When the derived amount $S_A/S_B$ is greater than or equal to the derived amount $S_C/S_B$ (Yes in S9), the computing unit 51 determines the distance L using the derived amount $S_A/S_B$ (S11), and when the derived amount $S_A/S_B$ is less than the derived amount $S_C/S_B$ (No in S9), the computing unit 51 determines the distance L using the derived amount $S_C/S_B$ (S10).

Thus, the computing unit 51 determines measurement distances for the respective pixels, and signals representing values of these measurement distances are input to the image-generating unit 52. The image-generating unit 52 receives the signals and generates a depth map (S12). The depth map represents distance information with, for example, different colors or different shades of a specific color according to the distance.

[1-4. Effects and Others]

As described above, the distance measuring apparatus 1 according to this embodiment includes: the light-emitting element 11 which is a light source that emits the first pulsed beam, the second pulsed beam, and the third pulsed beam which have an identical pulse waveform, within a predetermined time; the light-receiving element 21 including an array of a plurality of sensors that, in synchronization with the light-emitting element 11, detect reflected light, convert the reflected light into electrical signals, and accumulate the electrical signals over the predetermined exposure time $(t_2-t_1)$, the reflected light being each of the first pulsed beam, the second pulsed beam, and the third pulsed beam that have been emitted from the light-emitting element 11 and reflected off the object 90; and the computing unit 51 derives the distance L to the object 90 using the first signal amount $S_A$, the second signal amount $S_B$, and the third signal amount $S_C$, the first signal amount $S_A$ being output by the plurality of sensors as a result of detecting, over the predetermined exposure time $(t_2-t_1)$ from the first point in time, light including the reflected light that is the first pulsed beam reflected off the object 90, the second signal amount $S_B$ being output by the plurality of sensors as a result of detecting, over the predetermined exposure time $(t_2-t_1)$ from the second point in time, light including the reflected light that is the second pulsed beam reflected off the object 90, the third signal amount $S_C$ being output by the plurality of sensors as a result of detecting, over the predetermined exposure time $(t_2-t_1)$ from the third point in time, light including the reflected light that is the third pulsed beam reflected off the object 90. The computing unit 51 then determines the first derived amount and the second derived amount, and derives the distance L for each of the plurality of sensors, based on the first derived amount and the second derived amount for the sensor, the first derived amount being an amount derived using the first signal amount $S_A$ and the second signal amount $S_B$, the second derived amount being an amount derived using the third signal amount $S_C$ and the second signal amount $S_B$. The delay time $(T_A+t_1)$ from the start of emission of the first pulsed beam to the first point in time is larger than the delay time $(T_B+t_1)$ from the start of emission of the second pulsed beam to the second point in time, and the delay time $(T_B+t_1)$ from the start of emission of the second pulsed beam to the second point in time is larger than the delay time $(T_C+t_1)$ from the start of emission of the third pulsed beam to the third point in time. Note that the above delay time can be a positive or negative value; a positive delay time means that exposure starts after the start of emission of the first to third pulsed beams, and a negative delay time means that exposure starts before the start of emission of the first to third pulsed beams.

With this, the distance measuring apparatus 1 according to this embodiment is capable of reducing distance computation errors by measuring a distance using the first derived amount when the object 90 is relatively far away, and measuring a distance using the second derived amount when the object 90 is relatively close by.

Furthermore, in the distance measuring apparatus 1 according to this embodiment, when a difference between the first derived amount and the second derived amount that correspond to the same one of the sensors is within a predetermined range, the computing unit 51 determines an amount of surrounding light using the first derived amount and the second derived amount and derives the distance L based on the first derived amount or the second derived amount.

With this, the distance measuring apparatus 1 according to this embodiment is capable of determining an amount of surrounding light without another process of measuring the amount of surrounding light, and therefore is capable of reducing errors in distance measurement that are attributable to the amount of surrounding light.

Furthermore, the distance measuring apparatus 1 according to this embodiment includes the storage unit 53 on which the relationship between the amount of surrounding light and the first derived amount or the second derived amount is recorded as a comparison table, and the computing unit 51 determines an amount of surrounding light based on the comparison table.

With this, the distance measuring apparatus 1 according to this embodiment is capable of determining an amount of surrounding light with the use of the comparison table recorded on the storage unit 53, eliminating the need to include another unit that measures or calculates an amount of surrounding light, for example; it is possible to determine an amount of surrounding light quickly and easily.

Embodiment 2

Hereinafter, a distance measuring apparatus according to Embodiment 2 is described with reference to FIG. 7 and FIG. 8.

In the above distance measuring apparatus 1 according to Embodiment 1, the exposure period is from $T_u+T_1$ to $T_u+t_2$. Out of the parameters that determine this exposure period, $T_u$ which determines the timing of turning the trigger signal ON can be set to any value that an operator of the distance measuring apparatus 1 desires. However, a net exposure time $(t_2-t_1)$ cannot be set to a desired value and depends on a numerical value unique to each light-receiving element, such as manufacturing variations in light-receiving elements and capacitance or resistance components inherent to light-receiving elements regardless of designer's intent. Therefore, in order to improve the accuracy of distance measurement in the distance measuring apparatus 1, it is necessary to find an exposure time and perform calibration for each distance measuring apparatus 1. Furthermore, in the case of long-term use of the distance measuring apparatus 1, the exposure time changes over time due to such factors as variations in the threshold value of a transistor in the light-receiving element. Therefore, in order to reduce such temporal changes in the accuracy of the distance measuring apparatus 1, it is necessary to regularly find a net exposure time of the distance measuring apparatus 1 and perform calibration.

Thus, this embodiment describes a distance measuring apparatus capable of finding an exposure time as advance preparation for measuring a distance to the object.

[2-1. Structure]

A main structure of the distance measuring apparatus according to this embodiment is represented by the same or like block diagram as that of FIG. 1; therefore, descriptions thereof will be omitted. This embodiment is different from Embodiment 1 described above, in the processing which the computing unit 51 performs. Such processing will be described in detail later, along with the operation according to this embodiment.

[2-2. Principle of Distance Measurement]

The principle of distance measurement by the distance measuring apparatus according to this embodiment is the same as that of the distance measuring apparatus 1 according to Embodiment described above, except finding the above exposure time; therefore, the following describes finding an exposure time.

Figure 7:
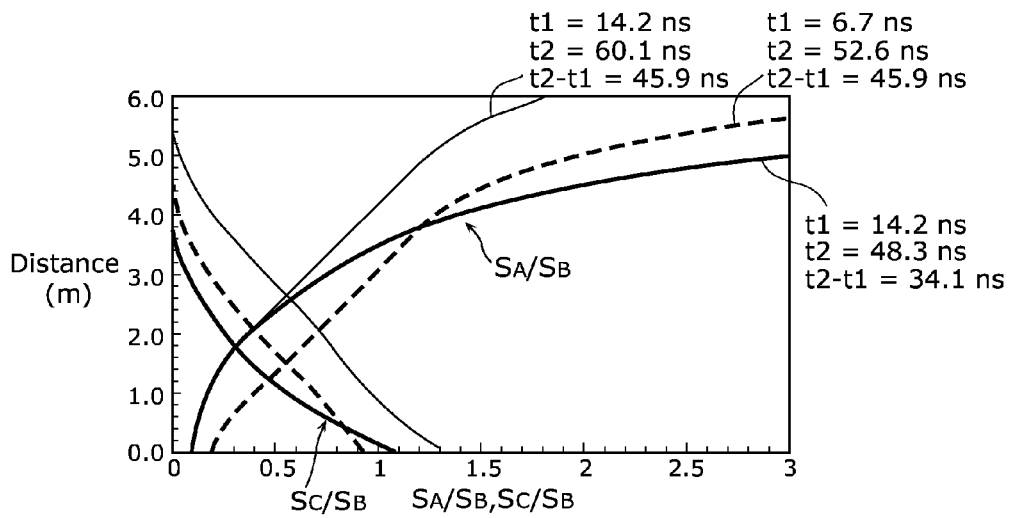
FIG. 7 is a graph showing the relationship between a distance L and derived amounts $S_A/S_B$ and $S_C/S_B$ in a distance measuring apparatus according to Embodiment 2.

FIG. 7 is a graph which combines a graph showing the derived amount $S_A/S_B$ along the horizontal axis and the distance L to the object 90 along the vertical axis, and a graph showing the derived amount $S_C/S_B$ along the horizontal axis and the distance L to the object 90 along the vertical axis, obtained by calculation for different values of exposure time $(t_2-t_1)$. For the graph, the following is assumed: $T_R$=18 ns, $T_F$=8 ns, $T_0$=22.2 ns, and i=0.715*I. In FIG. 7, the graph for $t_1$=6.7 ns and $t_2$=52.6 ns, that is, for an exposure time of 45.9 ns, is plotted as a broken line, and the graph for $t_1$=14.2 ns and $t_2$=48.3 ns, that is, for an exposure time of 34.1 ns, is plotted as a thick solid line. The graph for an exposure time of 45.9 ns where $t_1$ is 14.2 ns is plotted as a thin solid line. Each derived amount in FIG. 7 is a value obtained where there is no surrounding light.

As shown in FIG. 7, the graph of the derived amount $S_A/S_B$ and the graph of the derived amount $S_C/S_B$ in a certain exposure time intersect at one point. The value of the derived amount at the intersection depends on the length of the exposure time $(t_2-t_1)$ and does not depend on the value of $t_1$ per se or the value of $t_2$ per se. This can be seen from the fact that the intersection of the broken lines and the intersection of the thin solid lines have the same value along the horizontal axis in FIG. 7. Therefore, in order to find an exposure time, first, a list (a lookup table) of association between (i) different values of the exposure time and (ii) the derived amount $S_A/S_B$ or the derived amount $S_C/S_B$ that is at the intersection of the graphs of the derived amount $S_A/S_B$ and the derived amount $S_C/S_B$ in FIG. 7 is recorded in advance onto the storage unit 53 of the CPU 50. When a difference between the derived amount $S_A/S_B$ and the derived amount $S_C/S_B$ is within a predetermined range, the exposure time that is associated with the derived amount is determined with reference to the comparison table. Note that the criterion for the determination is whether the difference between the derived amount $S_A/S_B$ and the derived amount $S_C/S_B$ "is within a predetermined range" rather than "is zero." This is because having a certain range of tolerance in determining the above derived amounts to be the same value is realistic under the present circumstances that it is rare that the derived amount $S_A/S_B$ and the derived amount $S_C/S_B$ completely match each other as a disturbance component is superimposed on each of the signal amounts. A measurer provides multiple objects 90 at various distances within a measurement space in advance so that multiple values of the derived amount $S_A/S_B$ and the derived amount $S_C/S_B$ that fall within the range are detected, which allows the determination of the exposure time to be performed multiple times. The average value of the results of the determination is then adopted, making it possible to determine a more accurate value of the exposure time.

Note that upon deriving the derived amount $S_A/S_B$ and the derived amount $S_C/S_B$ in order to determine an exposure time, these derived amounts may be derived in the environment in which there is no surrounding light, so as to avoid being subject to the impact of surrounding light.

At a point in time when the exposure time has been determined according to the above-described principle, a process of generating a depth map may be performed based on the determined exposure time, as in the case of Embodiment 1 described above. Specifically, the computing unit 51 determines $t_2$ using the value of the exposure time $(t_2-t_1)$ determined according to the above-described principle and t1 which has a provisional value or uncalibrated value, and substitutes $t_1$, $t_2$, and other parameters into Expressions (3) to (6) stated above to calculate the relationship between (a) the signal amount and the derived amount and (b) the flight time, and then derives the distance L to the object 90 based on (i) the derived amount that is an amount derived using the detected signal amounts and (ii) the calculated relationship between the derived amount and the flight time. In this case, since the absolute values of $t_1$ and $t_2$ are not precise, the absolute distance to the object is not very precise in a resultant depth map, but a relative distance between the objects in the depth map resulting from the measurement can be almost precise. This can also be seen from the fact that the graph plotted as a thin solid line is almost equal to a graph obtained by translating the graph plotted as a broken line along the vertical axis in FIG. 7.

[2-3. Operation]

Figure 8:
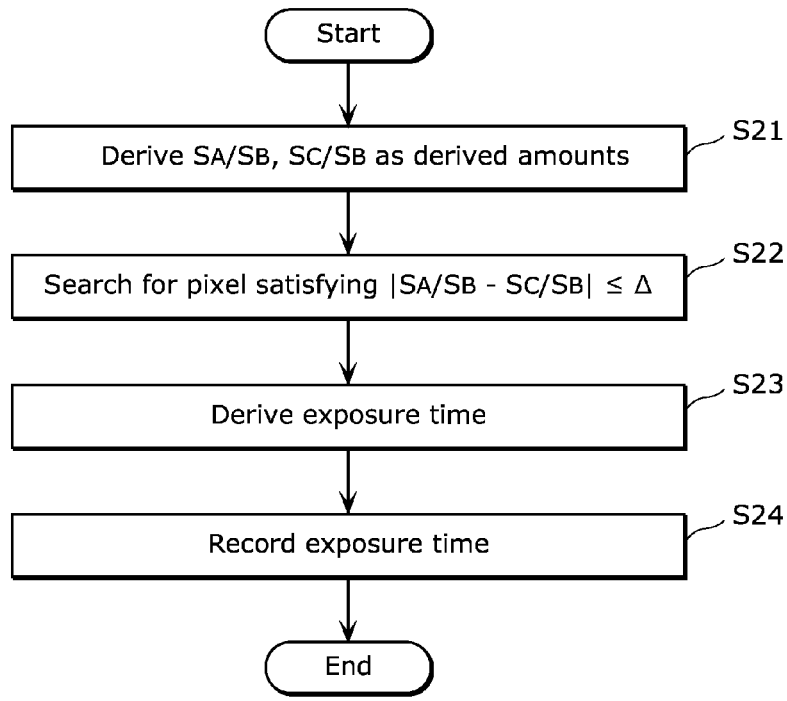
FIG. 8 is a flowchart showing a flow of operations performed by a distance measuring apparatus according to Embodiment 2, for finding an exposure time.

The following describes, with reference to FIG. 8, a flow in which the distance measuring apparatus according to this embodiment is operated based on the above-described principle to find the exposure time $(t_2-t_1)$.

FIG. 8 is a flowchart showing a flow of operations performed by the distance measuring apparatus according to this embodiment, for finding an exposure time.

First, multiple objects 90 are provided at various distances within the measurement space of the distance measuring apparatus according to this embodiment, and the computing unit 51 determines, in a situation in which there is no surrounding light, the derived amount $S_A/S_B$ and the derived amount $S_C/S_B$ of a pixel corresponding to each sensor of the light-receiving element 21 as in the case of Embodiment 1 described above (S21).

Next, the computing unit 51 determines a difference between the derived amount $S_A/S_B$ and the derived amount $S_C/S_B$ of a pixel corresponding to each sensor of the light-receiving element 21, and searches for a pixel having the difference that is within a predetermined range (S22). The computing unit 51 finds a pixel having the difference that is within the predetermined range (the absolute value of which is less than or equal to a predetermined value A) and compares the value of the derived amount $S_A/S_B$ or the derived amount $S_C/S_B$ that corresponds to that pixel with the derived amount indicated in the comparison table recorded on the storage unit 53 and showing the relationship between the exposure time and the derived amount, to determine the exposure time that is associated with that derived amount (S23). The computing unit 51 records the determined exposure time onto the storage unit 53 (S24) and uses the recorded exposure time in the subsequent calculation for distance measurement. Operation in the subsequent calculation for distance measurement is as described above with reference to FIG. 6, etc.

[2-4. Effects and Others]

As described above, in the distance measuring apparatus according to this embodiment, when the difference between the first derived amount and the second derived amount that are output from the same one of the sensors is within the predetermined range, the computing unit 51 determines the exposure time using the first derived amount or the second derived amount, and derives a distance based on that exposure time and the first derived amount or the second derived amount.

With this, the distance measuring apparatus according to this embodiment is capable of determining a net exposure time so that the calibration by the distance measuring apparatus can be performed with ease and accuracy. In order to determine an exposure time with a conventional distance measuring apparatus, a measurer needs to provide the object at a position the distance of which has been precisely known within the measurement space in advance, and do the task of checking which pixel of the light-receiving element the position is mapped on, before distance measurement, and the distance measurement needs to be repeated with different parameters in the distance computation until the distance measurement result thereof is equal to the value of the actual distance. In contrast, in this embodiment, there is no need to prepare an object the distance of which has been precisely known in advance in order to find an exposure time, and a measurer only needs to provide the objects 90 at various distances within the measurement space of the distance measuring apparatus. Therefore, it is possible to adopt a physical object having a complicated shape as the object 90. Furthermore, there is no need to check which pixel of the light-receiving element a position is mapped on, and the task of determining which pixel is used to determine an exposure time is substituted by the distance measuring apparatus determining a difference between the derived amount $S_A/S_B$ and the derived amount $S_C/S_B$ and searching for a pixel having the difference that is within a predetermined range. Thus, it is possible to find an exposure time by doing such a simple task. Accordingly, with the distance measuring apparatus according to this embodiment, it is easy to regularly find an exposure time for each distance measuring apparatus.

Furthermore, the distance measuring apparatus according to this embodiment includes the storage unit 53 on which the relationship between the exposure time and the first derived amount or the second derived amount is recorded as a comparison table, and the computing unit 51 determines an exposure time based on the comparison table.

With this, the distance measuring apparatus according to this embodiment is capable of determining an exposure time with the use of the comparison table recorded on the storage unit 53, and therefore is capable of performing calibration quickly and easily.

Variations and Others

As described above, exemplary embodiments are described as exemplifications of the technique according to the present disclosure. The accompanying drawings and detailed description are provided for this purpose.

Therefore, the structural elements described in the accompanying drawings and detailed description include, not only structural elements essential to solving the problem, but also structural elements that are not essential to solving the problem but are included in order to exemplify the aforementioned technique. As such, description of these non-essential structural elements in the accompanying drawings and the detailed description should not be taken to mean that these non-essential structural elements are essential.

Furthermore, since the foregoing embodiments are for exemplifying the technique according to the present disclosure, various changes, substitutions, additions, omissions, and so on, can be carried out within the scope of the Claims or its equivalents.

Other embodiments implemented by combining arbitrary structural elements in the foregoing embodiments, variations obtained by executing various modifications on the foregoing embodiments that can be conceived by a person of ordinary skill in the art without departing from the essence of the present disclosure, and various devices incorporating the distance measuring and imaging apparatus disclosed herein are included in the present disclosure.

Note that the subject matter disclosed herein can be implemented not only as a distance measuring apparatus including the above-described characteristic structure, but also as a distance measuring method for the distance measuring apparatus.

Specifically, a distance measuring method for the distance measuring apparatus according to the present disclosure includes: emitting, from the light source, the first pulsed beam, the second pulsed beam, and the third pulsed beam which have an identical pulse waveform, within the predetermined time; detecting reflected light, converting the reflected light into electrical signals, and accumulating the electrical signals over the predetermined exposure time, by the plurality of sensors in an array, in synchronization with the light source, the reflected light being each of the first pulsed beam, the second pulsed beam, and the third pulsed beam that have been emitted from the light source and reflected off the object;

deriving a distance to the object using the first signal amount, the second signal amount, and the third signal amount, the first signal amount being output by the plurality of sensors as a result of detecting, over the predetermined exposure time from the first point in time, light including the reflected light that is the first pulsed beam reflected off the object, the second signal amount being output by the plurality of sensors as a result of detecting, over the predetermined exposure time from the second point in time, light including the reflected light that is the second pulsed beam reflected off the object, the third signal amount being output by the plurality of sensors as a result of detecting, over the predetermined exposure time from the third point in time, light including the reflected light that is the third pulsed beam reflected off the object; and determining a first derived amount and a second derived amount, and deriving the distance for each of the plurality of sensors, based on the first derived amount and the second derived amount for the sensor, the first derived amount being an amount derived using the first signal amount and the second signal amount, the second derived amount being an amount derived using the third signal amount and the second signal amount, and the delay time from the start of emission of the first pulsed beam to the first point in time is larger than the delay time from the start of emission of the second pulsed beam to the second point in time, and the delay time from the start of emission of the second pulsed beam to the second point in time is larger than the delay time from the start of emission of the third pulsed beam to the third point in time.

With this, it is possible to reduce distance computation errors by measuring a distance using the first derived amount when the object is relatively far away, and measuring a distance using the second derived amount when the object is relatively close by.

Although $S_A/S_B$ and $S_C/S_B$ are used as the derived amount in the above embodiments, the derived amount is not limited to this example. It is sufficient if the derived amount can cancel out Q in Expressions (3) to (6) by using $S_A(S_C)$ and $S_B$. For example, $S_B/S_A$ and $S_B/S_C$ may be used as the derived amounts.

Furthermore, although the above embodiments describe the examples in which the exposure time is the same for all the first to third pulsed beams, the exposure time does not always need to be the same for all these beams.

Furthermore, although the above embodiments describe the example in which the comparison table recorded on the storage unit 53 is used in order to determine an amount of surrounding light or an exposure time, the configuration for determining an amount of surrounding light or the like is not limited to this example. For example, a function of the amount of surrounding light with respect to the derived amount may be recorded onto the storage unit 53 and be used to determine an amount of surrounding light or the like.

INDUSTRIAL APPLICABILITY

The technique according to the present disclosure can be applied to a distance measuring apparatus or a device which uses a distance measuring method. Specifically, the technique according to the present disclosure can be applied to a digital still camera, a video camera, a cell phone with a camera, a smartphone, etc.

The invention claimed is:

1. A distance measuring apparatus comprising:
a light source that emits a first pulsed beam, a second pulsed beam, and a third pulsed beam which have an identical pulse waveform, within a predetermined time;
a light-receiving element including an array of a plurality of sensors that, in synchronization with the light source, detect reflected light, convert the reflected light into electrical signals, and accumulate the electrical signals over a predetermined exposure time, the reflected light being each of the first pulsed beam, the second pulsed beam, and the third pulsed beam that have been emitted from the light source and reflected off an object; and
a computing unit configured to derive a distance to the object using a first signal amount, a second signal amount, and a third signal amount, the first signal amount being output by the plurality of sensors as a result of detecting, over the predetermined exposure time from a first point in time, light including the reflected light that is the first pulsed beam reflected off the object, the second signal amount being output by the plurality of sensors as a result of detecting, over the predetermined exposure time from a second point in time, light including the reflected light that is the second pulsed beam reflected off the object, the third signal amount being output by the plurality of sensors as a result of detecting, over the predetermined exposure time from a third point in time, light including the reflected light that is the third pulsed beam reflected off the object,
wherein the computing unit is configured to determine a first derived amount and a second derived amount, and derive the distance for each of the plurality of sensors, based on the first derived amount and the second derived amount for the sensor, the first derived amount being an amount derived using the first signal amount and the second signal amount, the second derived amount being an amount derived using the third signal amount and the second signal amount,
a delay time from a start of emission of the first pulsed beam to the first point in time is larger than a delay time from a start of emission of the second pulsed beam to the second point in time, and
the delay time from the start of emission of the second pulsed beam to the second point in time is larger than a delay time from a start of emission of the third pulsed beam to the third point in time.

2. The distance measuring apparatus according to claim 1, wherein the first derived amount is a ratio of the first signal amount to the second signal amount, and increases as the distance increases, and
the second derived amount is a ratio of the third signal amount to the second signal amount, and increases as the distance decreases.

3. The distance measuring apparatus according to claim 1, wherein when a difference between the first derived amount and the second derived amount for a same one of the plurality of sensors is within a predetermined range, the computing unit is configured to determine the predetermined exposure time using the first derived amount or the second derived amount, and derive the distance based on the predetermined exposure time and the first derived amount or the second derived amount.

4. The distance measuring apparatus according to claim 1, wherein when a difference between the first derived amount and the second derived amount for a same one of the plurality of sensors is within a predetermined range, the computing unit is configured to determine an amount of surrounding light using the first derived amount or the second derived amount, and derive the distance based on the amount of surrounding light and the first derived amount or the second derived amount.

5. The distance measuring apparatus according to claim 3, comprising
a storage unit on which a relationship between the predetermined exposure time and the first derived amount or the second derived amount is recorded as a comparison table,
wherein the computing unit is configured to determine the predetermined exposure time based on the comparison table.

6. The distance measuring apparatus according to claim 4, comprising
a storage unit on which a relationship between the amount of surrounding light and the first derived amount or the second derived amount is recorded as a comparison table,
wherein the computing unit is configured to determine the amount of surrounding light based on the comparison table.

7. The distance measuring apparatus according to claim 2, wherein the computing unit is configured to derive the distance based on the first derived amount when the first derived amount is greater than the second derived amount, and derive the distance based on the second derived amount when the first derived amount is less than the second derived amount.

8. The distance measuring apparatus according to claim 1, wherein light-emitting intensity of the light source changes over time within a light-emitting period, and increase and decrease in the first derived amount and the second derived amount have a nonlinear relationship with a change in the distance.

9. A distance measuring method comprising:
emitting, from a light source, a first pulsed beam, a second pulsed beam, and a third pulsed beam which have an identical pulse waveform, within a predetermined time;
detecting reflected light, converting the reflected light into electrical signals, and accumulating the electrical signals over a predetermined exposure time, by a plurality of sensors in an array, in synchronization with the light source, the reflected light being each of the first pulsed beam, the second pulsed beam, and the third pulsed beam that have been emitted from the light source and reflected off an object;
deriving a distance to the object using a first signal amount, a second signal amount, and a third signal amount, the first signal amount being output by the plurality of sensors as a result of detecting, over the predetermined exposure time from a first point in time, light including the reflected light that is the first pulsed beam reflected off the object, the second signal amount being output by the plurality of sensors as a result of detecting, over the predetermined exposure time from a second point in time, light including the reflected light that is the second pulsed beam reflected off the object, the third signal amount being output by the plurality of sensors as a result of detecting, over the predetermined exposure time from a third point in time, light including the reflected light that is the third pulsed beam reflected off the object; and determining a first derived amount and a second derived amount, and deriving the distance for each of the plurality of sensors, based on the first derived amount and the second derived amount for the sensor, the first derived amount being an amount derived using the first signal amount and the second signal amount, the second derived amount being an amount derived using the third signal amount and the second signal amount, wherein a delay time from a start of emission of the first pulsed beam to the first point in time is larger than a delay time from a start of emission of the second pulsed beam to the second point in time, and the delay time from the start of emission of the second pulsed beam to the second point in time is larger than a delay time from a start of emission of the third pulsed beam to the third point in time.

* * * * *